United States Patent [19]

Harrison

[11] Patent Number: 4,872,993

[45] Date of Patent: Oct. 10, 1989

[54] WASTE TREATMENT

[76] Inventor: George C. Harrison, 32 Mid Oaks La., Roseville, Minn. 55113

[21] Appl. No.: 159,688

[22] Filed: Feb. 24, 1988

[51] Int. Cl.$^4$ .................................................. C02F 1/28
[52] U.S. Cl. ..................................... 210/666; 210/667; 210/710; 210/725; 210/727; 210/737; 210/768; 501/141; 501/155
[58] Field of Search ................................ 210/665–667, 210/710, 721, 725, 727, 728, 737, 768, 769, 751, 912, 904, 906, 908, 909, 915; 501/141, 155

[56] References Cited

U.S. PATENT DOCUMENTS

| | | | |
|---|---|---|---|
| 3,300,406 | 1/1967 | Pollio | 210/666 |
| 3,859,210 | 1/1975 | Hatch | 210/666 |
| 4,112,033 | 9/1978 | Lingl | 501/155 |
| 4,145,278 | 3/1979 | Davy | 210/711 |
| 4,279,756 | 7/1981 | Weiss et al. | 210/667 |
| 4,405,105 | 9/1983 | deLockerente et al. | 210/710 |
| 4,425,238 | 1/1984 | Degen et al. | 210/667 |
| 4,638,273 | 1/1983 | Puskas | 501/155 |

FOREIGN PATENT DOCUMENTS

| | | | |
|---|---|---|---|
| 53-44938 | 12/1978 | Japan | 501/155 |
| 58-181758 | 10/1983 | Japan | 501/155 |

*Primary Examiner*—Peter Hruskoci
*Attorney, Agent, or Firm*—Dean P. Edmundson

[57] ABSTRACT

Processes and techniques are described for treating waste water (domestic and industrial) to remove organic matter and heavy metals. Clay and flocculating agent are added to the waste water to cause separation of a sludge. The sludge is fired at high temperature in particle form to produce ceramic particles. Organic matter is oxidized; heavy metals are bound within the ceramic particles and cannot leach out. The ceramic particles are useful as aggregate (e.g., in concrete) and in landscaping.

12 Claims, No Drawings

WASTE TREATMENT

FIELD OF THE INVENTION

This invention relates to waste treatment. More particularly, this invention relates to treatment of waste water. Even more particularly, this invention relates to treatment of domestic waste water and also industrial waste water. In another aspect this invention relates to firing of sludge products to produce ceramic particles.

BACKGROUND OF THE INVENTION

In the not-so-distant past, the acceptable means to dispose of wastes were as water-borne wastes in sewage systems, as dry wastes or garbage for on-land dumping, and as a fuel (when significantly dry) in incinerators. Biological attack on water-borne wastes or on-land fill wastes would reduce the total waste content to an acceptable level for landfill and into natural waters for disposal. Even the ash from incineration was a suitable material for additional landfill.

The wastes of our modern society are a radical change from the past. Materials that compose our wastes are biorefractory, often toxic, and sometimes carcinogenic. On incineration, modern wastes may produce hazardous gases that evolve into our atmosphere and leave ash containing toxic heavy metals. A major problem arises because governmental agencies are unwilling to ask the public to support anything beyond the traditional means of waste handling. Efforts to improve traditional sewage treatment plants and efforts to confine all wastes to landfills by sealing against extraction of toxic matter are proving to be less than adequate.

There has not heretofore been provided a fully safe and effective means for treatment of waste materials, especially those found in domestic and industrial waste water.

SUMMARY OF THE INVENTION

In accordance with the present invention there is provided a method for treatment of waste water (both domestic and industrial) to recover sludge which is then fired to produce a ceramic product which is safe and which is useful for landscaping, or as aggregate in concrete, or as "grog" in the ceramics industry. The water is rendered sufficiently clean of organic and inorganic toxins to be useful for unrestricted recreation.

The techniques of the invention include a process for treatment of waste water comprising:
 (a) mixing with the waste water a finely divided lay to form a blend;
 (b) adding a flocculant to the blend in a manner such that the clay absorbs soluble organic and inorganic wastes and bonds dispersed organic and inorganic wastes, and wherein the clay bonds to the flocculant to form a sludge;
 (c) separating the sludge from the water;
 (d) reducing water content of the sludge to less than about 60% by weight;
 (e) shaping the sludge to form particles of desired size and shape;
 (f) firing the sludge particles at a temperature and for a time sufficient to convert the sludge particles to ceramic particles.

In this invention, wastes are reduced by weight and volume by a unique method of burning that assures all off-gases are those common to the atmosphere. Water treated in accordance with this invention contains only materials in solution commonly found as solubles in natural water, such natural water being classified as unpolluted in any way by man. Finally, those materials not subject to combustion to gases naturally occurring in the atmosphere, and not soluble as salts in natural waters and generally considered an ash or fly ash of normal combustion of the original waste, become a part of a ceramic product.

The basic technique of the invention involves incorporating organic waste material, inorganic waste material, or both, into clay which is shaped and then fired in a kiln. When the wastes are burned in the kiln as part of the shaped clay particle, the normal ash, flyash, and other particulate matter associated with normal combustion are physically and chemically bonded within the resulting ceramic product.

Under the conditions of a ceramic "burn", organic matter becomes vapors, leaving the ceramic shape through the micro-pores of the ceramic surface. These vapors are molecular in size. These vapors are formed of volatile molecules or became molecular size vapors from destructive distillation, leaving carbon residues in the ceramic shape. These carbon residues in proper amounts are important because they cause expansion of the ceramic to a light-weight body under controlled conditions.

When the vapors generated as described above reach the surface of the ceramic shape, escaping through the microporosity of the ceramic shape surface, they suddenly move from a strongly-reducing atmosphere to a highly-oxidative atmosphere in the burning zone. Not only is there an excessive amount of oxygen from air forced through the kiln, but the ceramic surface contains heavy metals in their oxidized form to catalyze the burning of these individual organic molecules. Conditions are such that there is never oil-like droplets or mists of particulate matter sweeping through a flame without the opportunity of complete combustion.

Two elements which are generally toxic must be considered exceptions to the rule that all toxic wastes can be combined into harmless silicates by burning a ceramic shape. Mercury, which is rarely present in wastes, becomes a vapor escaping the ceramic shape. Selenium, which is also rarely present in wastes, becomes selenates in the same manner that sulfur becomes sulfates. The alkali selenates are water-soluble and are extractable from the ceramic shapes. With either mercury or selenium present, special handling is required and such special handling may or may not be expensive depending on the raw waste.

It is to be understood that the total wastes of our society contain gross items that are of metal, wood, plaster, brick, plastic and paper and perhaps other building and packaging wastes, that are to be burned directly or disposed of in suitable landfills as "clean" landfill material. Such materials are not present in normal domestic or industrial waste water and accordingly are not referred to in the description of the present invention.

It is a further advantage of this invention that the hazardous toxic and carcinogenic materials of waste water sludges and industrial waste sludges do not need to be specially separated nor concentrated by any of the usual expensive means to prepare them for the methods of this invention. Amounts from fractional parts per million to tens of thousand parts per million are not unusual challenges to this invention. Large quantities of other toxic and nontoxic materials do not disguise very small amounts of any organic or inorganic toxic waste. Wastes from typical municipal sewages are basically organic with small amounts of toxic matter (if present at all). Common subsoil clays may contain sufficient reactive ingredients to clean municipal wastes as explained herein.

Industrial waste waters often contain far more toxic and more concentrated waste material. One or more treatment steps with clay may be used to remove waste material from industrial waste water, and some clays may work better than others for this purpose. Regardless of the waste sludge source, it is likely that toxic organic materials, toxic heavy metals, halocarbons and carcinogens are present or may be present at some time over the period such sludges are processed. It is also common for these sludges to contain appreciable inorganic content which, if burned directly, would produce large quantities of ash, and that a large percentage of the total ash would be fly ash entering the atmosphere. Also entering the atmosphere would be a measure of soot and smoke if direct burning were to be used. It has been well documented that fly ash, soot and smoke carry halocarbons and toxic heavy metals into the atmosphere.

In this invention, combustion of the sludge material prevents halocarbons and toxic heavy metals from entering the atmosphere.

Other advantages of the processes and techniques of this invention will be apparent from the following detailed description.

DETAILED DESCRIPTION OF THE INVENTION

Initially, the waste water is treated to remove the waste materials and form a sludge. If required, an alkali of choice is added to the waste water to adjust the pH into the range of about 7 to 9. Alkali materials best suited for this purpose are lime (calcium hydroxide) and lye (sodium hydroxide). Potassium hydroxide, soda (sodium carbonate) and others are less reactive and more expensive. Ammonia and potash are undesirable for this purpose.

Then finely divided clay of desired reactivity is added to the waste water and stirred to obtain a uniform blend.

The amount of clay added may vary. Commonly there are two parts of clay added per part of organic waste. Where there is little or no organic matter present in the waste water (e.g., industrial waste water), there may be added many parts of clay per part of total toxic and non-toxic heavy metals in the waste water. For example, there may be as much as 10 parts clay added to one part of heavy metals present, although generally not this much clay need be added.

The science of clay selection is to expect higher clay reactivities from the presence of elements having a normal valence of five replacing silica (which has a valence of four) in the tetrahydryl structures of clay. More importantly, greater reactivity is expected from clays where bivalent elements replace trivalent aluminium and iron. In almost all cases, magnesium replaces aluminum and the family of clays are called montmorillonites. The sodium content should be low to avoid expansive clay on wetting.

Chemicals are then added to the blend to flocculate the clay. There are many conventional flocculating agents which may be used. A preferred flocculating system utilizes alum (aluminum sulfate decahexahydrate). A small amount of polyacrylic acid is also preferably added (e.g., 1 ppm).

The flocculating agent causes the clay to precipitate out of the water, thereby carrying out the solid waste which was suspended in the waste water and much of the waste dissolved in the waste water. All such wastes are truly flocced but some floc particles are too small to enter the sediment formed in the time allotted during a practical operational time. Such fines are readily filtered out by deep bed filtration, recovered by backwashing and returned by proper processing to influent waste waters. Research has shown that these fines become heavy floc readily on the first recycle.

When the flocculating agents are alum and polyacrylic acid, the process is called CCBA (chemical and coordinate bonding and absorption) developed specifically for this work to make clay-organic sludges for ceramic pellets. With CCBA, performed properly, the effluent water from the deep bed filter will have a turbidity of less than two international turbidity units. This water is suited for dentrification. See U.S. Pat. No. 4,676,907. The denitrification filter can remove, besides nitrogen compounds like ammonia and nitrate, much of the remaining water soluble organics and traces of halocarbons. The biology present, in addition to denitrifying more often than not, reduces sulfate to flowers of sulfur and selenates (if present) to red metallic selenium. So once through the system described above, there is one stream from the process that is water which, when disinfected, is suited for unrestricted recreational use. If the salt load is reasonable, this water is also suited for agricultural use.

This sewage water sludge contains the organics of every description that may ever be found in raw sewage and all the inorganics that might be found in sewage, if the raw sewage was evaporated to dryness and burned to an ash.

In practice this clay-organic sludge as a settled floc is too wet for purposes intended, so simple techniques of using pressure and vacuum on thin layers of the sludge reduce the water content to about 40-50% solids. The water which is squeezed out is recycled as a small part of raw sewage.

At this point in the process, the final ceramic is designed. A clay is used specifically to give the final ceramic its maximum strength, which is normally a cheap local clay of the kaolinite types. If there are other wastes like ash from incineration or lime-alum wastes from local water plants, they too are added at this point. When this mass is both thoroughly mixed and has the consistency for extrusion, cutting, drying and firing, these state of the art processes are performed.

It is usual that the product desired is brick-like, smooth surface pellets of suitable size for concrete aggregate with a bulk density of 40-60 pounds per cubic foot with an economic value of four or five times that of rock aggregates with 90-100 pounds per cubic foot. Value means on a per ton basis.

It is a proper practice of this invention to assure the carbon residue from organic wastes in sewage are at proper levels to reduce metal oxides to lower oxide state, producing carbon monoxide, which when the ceramic is in its plasma (glossy) state, causes the formation of closed cell foams of the desired density. The chemical equation for most of the reaction is $3Fe_2O_3 + C \rightarrow 2Fe_3O_4 + CO$.

Red and yellow common clays gain their color from their iron content. Such common clays are the preferred clays for use in this invention. Pure clays are expensive and will not perform properly for this work.

Industrial sludges, the second group of sludges studied in this invention are usually far more concentrated than sewage sludges. They are ordinarily water based but can be totally oil or organic solvent based. It is normal for industrial sludges to need pretreatments. All such pretreatments need not be considered here, but a few are noted to make the general practice of this invention safe as well as functional.

Industrial sludges need to be neutral, perhaps even buffered, at a pH of 7-9. Adjusting pH can be a hazard as quantities of cyanide and hydrogen sulfide could be released to the work area atmosphere. Therefore, controlled pretreatments with ozone or hydrogen peroxide are necessary when cyanide and sulfides are present or might be present. Heavy metals, especially manganese and chromium, may be in their most oxidized state in certain industrial wastes. As a general rule, all toxic heavy metals need to be in their most reduced state to properly inter-react with the clays selected for treating industrial waste sludges. Heavy metal wastes must therefore be treated for their reduction to the lowest hydroxide or oxide state. Treatment with sulfur dioxide or other reducing agent is a suitable pretreatment step. An acid condition is developed so any final step requires neutralizing with an alkali of choice. Now all heavy metals, toxic or nontoxic, are present as the reduced oxide or hydroxide.

Clay is added to these industrial sludges to produce a body similar to the body discussed above with respect to municipal waste sewage sludges. There are problems associated with sludges with high heavy metal content. When toxic heavy metals and large quantities of nontoxic heavy metals like iron and aluminum are found in the same industrial sludge, kaolinic clays found to be preferred for sewage sludges do not expand and absorb and adsorb sufficient heavy metal ions.

It may be required to include clays of the montmorillionite family of clays to remove such metals. Natural montmorillionite clays generally exist in deposits at varying ratios of the acid form, the sodium salt form, the potassium salt form and the calcium salt form. When found in nature they are mixed with sand, silts, and other minerals but especially kaolinic clays. The sodium montmorillionite (called bentonite) is extremely expansive when wetted, is found reasonably pure, and generally useless in this invention. The calcium montmorillionite is found reasonably pure, is called nonexpansive bentonite, and alone it would be generally useless in this invention. The acid form and the potassium salt of montmorillionite are not found pure in nature but are most suited to react with heavy metals in a practical manner. Therefore, it is important to find a natural reactive clay of the montmorillionite family which expands sufficiently and exhibits the best of absorption and is chemically reactive (called adsorption). When a clay dispersion (−200 screen mesh) will settle to about 25-30% solids and not settle further for a long period of time, it shows one of the first and main criteria of suitable clay. Further study may show even then that as much as half the clay is of the kaolinic group. This invention recognizes that the presence of kaolinic clays aids the quality of the final ceramic shape.

It has been found that the element fluorine associates with silica in clay structures in a chemical manner quite unlike heavy metals. Yet fluorine, while not a heavy metal, proceeds to be absorbed and adsorbed into the silicate structure and like metals is somewhat removed from water and from certain industrial sludges.

For further discussion of this invention, the process used is relatively independent of both the type of clay and waste sludge sources. The physical properties and chemical reactions are common. The resulting clay-organic cakes have both water and volatile organic matter that may escape the clay cake during processing. To fully protect the atmosphere at best, air is drawn into the clay cake area and directed to the kiln to become process air for firing the ceramic. The clay cakes, regardless of source, follow the usual procedure of extrusion through a die, cutting the extruded form into solid cylinders, and tumbling to round the ends of the short cylinders. Tumbling also densifies the surface, and drying leaves a surface covered with microscopic pores. Oily vapors escape the pores and the vapors are individual molecules surrounded by a surplus of air to yield the cleanest possible burn. As the pellets reach higher temperatures, the break-down of organic matter is completed (pyrolysis), burning vapors in the most satisfactory manner and leaving elemental carbon for the final heavy metal oxided reduction.

At about 1700° F. even the most stable carbon compounds, fluorocarbons and saturated chlorocarbons like PCB's are either destructively distilled or burned a molecule at a time by the systems of this invention. At 2000° F. the residual carbon reacts with metal oxides to give a blown, mostly closed cell ceramic shape. Internally and on the surface, all heavy metal oxides present combine with the tetrahedryl structure of silica to give structures which are safe from heavy metal extraction by any acid condition found in nature. Even stronger bonds stable toward strong acids or alkalis can be made if the ceramic is held at its highest forming temperature. Such a process is called "soak time".

The properties of the cooled ceramic pellets or particles make them suited for concrete aggregate and ceramic "grog" for the heavy ceramic industry. When pellets are used, the properties of the concrete or ceramic are much the same except for much lower weight per unit volume.

Another pellet use has also become important. The invention can use more carbon residues in the clay and gain a much lighter aggregate. Such much lighter aggregate is useful as a fire-proof insulation or as a floating insulator on molten metals held for pouring into molds or held for dip coating. Finally, such pellets can be decoratively colored or used from their natural color as ground cover to prevent weed growth and wash-out of soil on slopes.

The off gasses from the kilns used to process ceramic clay pellets are fully oxidized so are free of cyanides, carbon monoxides and sulfides. Sulfur and halogen compounds common to both sewage and industrial wastes produce sulfuric acid and halogen acids (especially hydrocholoric acid). Nitrates and nitric acid are not formed in the combustion conditions in the kiln of this process. A simple alkali wash curtain for the kiln gasses removes these acids and makes them into salts found regularly in various amounts in natural waters.

It must be pointed out that the practice of this invention is well served by alkali wash curtains. It must also be pointed out that alkali wash curtains do not serve nearly as well for all other waste combustion processes. The alkali wash curtain collects soot, smoke, oily droplets, halocarbons and other particulate matter. Water from these wash curtains are a pollution problem to whatever site they are directed.

Clays may be only aluminum silicates containing only aluminum, silica, oxygen and hydrogen. Most natural clays, however, have alkali and alkaline earth families of elements substituted for hydrogen, elements that are metals substituted for aluminum, and transition elements substituted for silicon in from small to modest amounts in most natural clay beds. If these substituted elements make the clay moderately expansive to aid absorption and chemically reactive to aid adsorption, then the clay is suited for use in this invention. When the element iron is available as found in yellow and red natural clays, then it will be reduced during the plasma state of the ceramic in the kiln by carbon from pyrolysis of organics left from up-heat destructive distillation and produce carbon monoxide for much of the ceramics expansion.

When clays adsorb heavy metals by chemical bonding, then such heavy metals become a link in the silicate structures of the ceramic formed. Such heavy metals, toxic or not, are bonded so tightly that it matters little if the metal or its other salts are toxic. For example, berylium is most likely the most toxic element, yet its silicate, beryl, in its most valued form, emerald, is a precious stone of no toxicity whatsoever.

Only two clays, the most common, need to be considered here to make this invention meaningful in terms as to how clays become involved chemically. Pure kaolin clay is found in nature but has little use in this invention as it is a pure aluminum silicate of limited expansion and limited chemical reactivity. When kaolinite clays have other metal ions of lower valence substituted for the aluminum (e.g., $Mg^{++}, Li^+, Fe^{++}$, etc.) there appears to be ion exchange capacity to satisfy the gain in negative ion capacity. This need for a positive charge is usually satisfied by hydrogen or sodium (acid and alkali soils). Pure montmorillionite (the mineral, not the family) has a magnesium molecule substituted for every sixth aluminum molecule, giving a formula $Al_{1.67}Mg_{.33}Si_4O_{10}(OH_2)$. Such a clay structure has a need for water of hydration and a cation. The cation is usually hydrogen ion, sodium ion or potassium ion, though calcium ion can be present and satisfy the cation ion need of two basic montmorilionite anions. Thus, the sodium ion form is very expansive (drilling mud bentonite), the hydrogen ion form and the potassium ion form are moderately expansive, while the calcium form is not expansive (crosslinking fixes its dimensions).

The natural clays from feldspar weathering are primarily kaolinite with more or less iron substituted for aluminum. These kaolinite clays are primarily most useful in this invention to aid waste organic matter in sewages and very little heavy metal content in normal sewage to flocculate together. Kaolinite clays readily make good ceramic structures which may be the expanded ceramic forms of light-weight aggregates.

The volcanic origin basalts weathered to clays of nature produce montmorillionite family of clays and are from the basalt origin far more likely to be impure or widely substituted with other metals in place of any metal in the base formula $Al_{1.67}Mg_{.33}Si_4O_{10}(OH)_2$. Such clays have high metal ion exchange capacity and ready flocculation capability where iron is usually present and substituted for either aluminum or silicon. The basalt origin also produces kaolinites. The ratio of montmorillionites to kaolinites is about 2 to 1. While montmorillionites are likely to make poor quality ceramics, the usual presence of kaolinites improves the ceramic which may be the ceramic of an expanded form from organics in the wastes that also contain heavy metals now a part of the clay by ion exchange.

The pure kaolin clay mineral is 21% aluminum and 22% silicon. The pure montmorillionite mineral is 11% aluminum, 2% magnesium and 32% silicon. It is reasonable to expect a weathered basalt clay to be about 15% aluminum, about 25% silicon and about 1.5% magnesium with liberal substitutions of iron, sodium, potassium, calcium and smaller quantities of all other di- and tri-valent metal ions. It is especially noted that phosphorus and vanadium may be present and substituted for silicon giving rise to higher anion content.

In the practice of this invention, the first step is to know the organic matter in a waste and choose as local a clay as possible of suitable absorption for organic matter. If there are heavy metals present, both toxic and nontoxic, then a clay capable of absorption and adsorption in the ratios of proper activity and amount must be selected. Magnesium and iron replacing aluminum as determined by spectographic analysis in the basic clay structure have a profound effect as the clay absorbs, then adsorbs, other elements making them a part of the maze of the final ceramic product. On a molecular basis, not weight basis, an amount of about 5% of the aluminum should have been replaced, half with molecules of iron and half with molecules of magnesium. Such analysis usually indicates appreciable amounts of montmorillionite family of clays sufficiently "loaded" with iron molecules as the desired impurity. Carbon from waste pyrolysis reacts with ferric iron to yield carbon monoxide blowing the ceramic which in the plasma (near molten glass) state, producing black magnetite oxide, $Fe_3O_4$. Thus the interior of the ceramic shapes are black. They are black more from the magnetite than from residual carbon (if any).

With the widely varying types and amounts of the many elements, the ceramic produced could include a wide variety of ceramic properties and a variation of solubility of the elements that failed to be bonded to total inertness could result as the clay and waste are fired to form a ceramic. Testing of the final ceramic may be done to determine whether any metal can be leached from the ceramic.

Two well-known tests are adopted for use in this regard. The clays and the ceramics produced in this invention are digested in fuming nitric acid to determine the levels of all the metal elements and fluorine. This test is the total toxic limit concentration (TTLC) test. For this work, because nontoxic elements enter into the ceramics, they too are determined as a part of the TTLC tests on raw clay, on clay-organic sludges, and on the final ceramic. The other official test is called the soluble toxic limit concentration (STLC) test, where a particularly neutralized citric acid solution is used to extract toxic elements from the raw clay, the clay-raw sludge mix, and the ceramic produced in this invention.

It has been found that some naturally occurring clays which are useful in this invention may not produce ceramic particles which pass the TTLC test. However, no adverse effect has been observed when such ceramic particles are placed in an aquarium containing fathead minnows.

The techniques of the invention are unlike other methods for combustion of wastes. In Conventional Methods flyash or particulate matter, soot and oily droplets, and especially toxic and carcinogenic halocarbons may survive their limited residence time in an incinerator and then escape to the atmosphere. In the present invention no such materials escape to pollute the atmosphere. When the sludge particles are heated to the plasma state carbon reducing metal oxides provide gases which expand the ceramic particle, and organic material escapes the ceramic particle as a vapor through the microporosity of the ceramic into an atmosphere rich in oxygen so that all vapors burn instantly at the surface of the ceramic. It is believed that the ceramic surface is a catalyst for the combustion and that the combination of conditions avoids the formation of oily droplets, organic particulate matter, and flyash that may otherwise escape.

In the present invention heavy metals present in the sludge become part of the ceramic body in the final particles or aggregate. The heavy metals are bonded to total inertness in the ceramic shape and are not leachable out of the ceramic.

The heavy metals found in industrial wastes may include both toxic and non-toxic metals in varying ratios. They may be in their lowest valence state as oxides or hydroxides. They may also be present as phosphates, arsenates, sulfates, selenates, fluorides, etc.

The organic matter present in the waste may include various types of toxic materials, such as halocarbons, polynuclear armoatic hydrocarbons, chlorodibenzyl dioxanes, phenolics, cyano compounds, biocides, etc. They are all combustible using the techniques of this invention. The vapors generated while forming and drying the ceramic shapes are swept into the kiln used to fire the ceramic in such a manner that the vapors engage the ceramic shapes already in the heat of the zone of plasma temperatures. This assures that maximum heat and maximum contact with the ceramic shapes is obtained to burn the vapors in a minimum of time.

If desired, chemicals such as boric acid, boric acid salts, silicates and the like can be added to the clay to lower the plasma temperature during firing. Also, additives such as coal, coke, and spent activated carbon may be added to the clay to provide additional residual carbon in the clay. The presence of carbon causes the ceramic shape to expand during firing and thereby produce light-weight aggregate.

In another variation the final ceramic particles can be used to absorb unwanted solvents and oils. Then the particles are fired in the kiln in such a manner that an atmosphere containing excess oxygen is drawn over and through a bed of such particles. The particles are processed at high temperature with long soak periods to dispose of the waste without developing soot, smoke, fly ash and toxic gases when the effluent gases are washed with an alkali solution.

In another variation portions of the clay are replaced with ash from burned garbage or ash from burned sewage sludges. In another version portions of the clay are replaced with waste from sludges used to clarify and soften domestic water supplies, called alum-lime sludges. Such wastes make unsightly landfills and are the source of much dust if allowed to dry.

In another variation it is possible for the atmosphere in the kiln to be free of oxygen. For example, it could be an inert atmosphere when there are no combustible components in the sludge particles. A ceramic particle is obtained in which heavy metals are bonded into the structure and are not leachable.

Radioactive materials may also be processed in accordance with the techniques described herein. Although the radioactivity is not destroyed, the materials are bound into the ceramic particles and cannot be leached out.

It is also possible to process waste material in liquid carriers other than water, if desired.

The techniques of the invention are further illustrated by means of the following examples.

Example I

If sands, gravel and silts are removed from weathered basalt clays, a typical analysis is given here for informational purposes only, by spectrographic analysis in Column I. Column II is the analysis by TTLC and Column III is a typical industrial metal working operations sludge.

|  | COLUMN I Spectrographic Clay Analysis | COLUMN II TTLC Clay Analysis Mg/Kg | COLUMN III Company C Industrial Sludge Mg/Kg by TTLC Tests |
|---|---|---|---|
| Si | 21–26% | 210,000 |  |
| Al | 15–16% | 150,000 | 36,570 |
| Fe | 4.6% | 46,000 | 83,050 |
| Mg | 2.7% | 27,000 | 12,090 |
|  |  | 48,000 |  |
| Ca | 4.8% | some calcite present | 26,030 |
| Mn | 0.06% | 5,800 | 640 |
| Na | 1.3% | 13,000 | — |
| Ti | 0.9% | 9,000 | — |
| K | 6.0% | 61,000 | — |
| Cu | 0.02% | 190 | 300 |
| Ni | 0.0045% | 450 | 6,000 |
| Cr | 0.03% | 3,100 | 55,000 |
| V | 0.03% | 2,800 | 18,800 |
| Zn | 0.3% | 1,100 | 600 |
| Co | 0.05% | 50 | — |
| P |  | — | 360 |
| Cd |  | <0.01 | 1,200 |
| Pb |  | 20 | 500 |
| Se |  | <0.01 | <1 |

The above clay (using eight parts) and the industrial sludge (using one part) has the principal ingredients of the clay unchanged and they would only be partly determined by the TTLC test. Since the principal ingredients of the clay are nontoxic, the TTLC test is not designed for their measurement. All but silicon and the alkali and alkaline earths were measured in a study using the TTLC test. Column III shows the total tested elements on Company C's low chromium sludge; Column IV shows their high chromium sludge toxic elements only. Column V shows the soluble toxics in the citric acid STLC Tests. The final Column VI shows the level of STLC if the clay mixture of Column I, eight parts; and Column II, one part waste, is well mixed and made into a ceramic at 2050° F. with 15–30 minute soak time.

|  | COLUMN III (repeated) Company C Normal Sludge Mg/Kg | COLUMN IV Company C High Chrome Sludge Mg/Kg | COLUMN V Company C Normal Sludge STLC Mg/L | COLUMN VI Company C Normal Ceramic STLC Mg/L |
|---|---|---|---|---|
| Al | 36,570 |  |  |  |
| Fe | 83,050 |  |  |  |
| Mg | 12,090 |  |  |  |
| Ca | 26,030 |  |  |  |
| Mn | 640 |  |  |  |
| P | 360 |  |  |  |
| Cr | 55,000 | 134,000 | 55 | 0.1 |
| Cd | 1,200 | 190 | 4.2 | 0.12 |

| | COLUMN III (repeated) Company C Normal Sludge Mg/Kg | COLUMN IV Company C High Chrome Sludge Mg/Kg | COLUMN V Company C Normal Sludge STLC Mg/L | COLUMN VI Company C Normal Ceramic STLC Mg/L |
|---|---|---|---|---|
| Cu | 300 | 5,500 | 26 | 2.0 |
| Ni | 6,000 | 8,400 | 29 | 1.1 |
| Pb | 500 | 400 | <.02 | <.02 |
| Se | <1 | <1 | — | — |
| V | 18,800 | 10,800 | 14.0 | 5 |
| Zn | 1,400 | 600 | .39 | 0.88 |

| | | |
|---|---|---|
| Cr* | 47 | 84* |
| Cd | 81 | — |
| Ni | 59 | — |
| Pb | 93 | — |
| Ag | 100 | — |

*spiked with potassium dichromate which undoubtedly did not have time to be reduced by the organics in waste water (4 minutes × 10 minutes) to become $Cr^{++}$ or $Cr^{+++}$ which react with clay.

It is evident from the tables that the normal sludge of Column I, mixed with clay; Column III shows normal extraction with citric acid on the industrial sludge clay mix and does not solubilize the toxic heavy metals by the STLC Tests. The tables show the ceramic from the clay-sludge mix is almost completely non-extractable with the citric acid solution.

The data from these tables are typical of many industrial sludges yet some elements are not considered in Company C sludges. Company C has 15,000 Mg/L of fluorine which was absent in the STLC Test on the ceramic.

Example II Waste water from Tijuana, Mexico was treated with clay and the before and after heavy metal removal was determined as a percent of original amount present, removed by clay and then further removed by filtering off the fine floc that did not settle.

| Element | Maximum % removed from clay sludge | Maximum % removed from clay sludge after filtering |
|---|---|---|
| Cu | 95 | 96 |
| Zn | 92 | 94 |
| Cr | 97 | 100 |
| Cd | 69 | 77 |
| Ni | 86 | 87 |
| Pb | 74 | 93 |
| Ag | 100 | 100 |
| Cu | 94 | 98 |
| Zn | 90 | 95 |

Example III

The Tijuana, Mexico waste water has been analyzed repeatedly for toxic organic content as there is no law in Mexico about toxic materials being dumped into sewers. Of some 350 potential toxic organic compounds, ten of the most prominent in the waste water were followed by means of before and after samples from pilot plant operations. There was a time limit of one minute from clay mixing until flocculation began. It should be understood that this amount of time is hardly adequate.

| Toxic Organic Compounds | % Removed |
|---|---|
| Methylene Chloride | 96 |
| 1,1,1,-Tri-Chlorothane | 83 |
| Tetra-Chloroethene | 66 |
| Naphthalene | 98 |
| Pyrene ($C_{16}H_{10}$) | 99 |
| Xylene | 58 |
| Chlorobenzene | 36 |
| Chloroform | 44 |
| Methyl Ethyl Ketone | 98 all that was above detectable limit. |

The family of chlorodioxans are absorbed on clay soils. This work does not disclose the distruction of dioxans in the formation of the ceramic particles.

Example IV

In this example, two firing temperatures used in the kiln with 30 minute soak time, shows the amount of 17 elements that can be extracted by the TTLC and the STLC Test. While 1700° F. results in a ceramic of a weak structure, 2200° F. makes a strong ceramic that nearly melts the pellets to a glass-like mass. The significant "fixing" of the toxic heavy metals by ceramic formation is evident.

| COLUMN I Element | COLUMN II Dewatered Sludge Cake Mg/Kg | COLUMN III Ceramic Fired at 1700° TTLC Mg/Kg | COLUMN IV Ceramic Fired at 2200° TTLC Mg/Kg | COLUMN V Ceramic Fired at 2200° F. (STLC) Mg/L | COLUMN VI Max. TTLC Allowed by Regulation Catch 22 Mg/Kg | COLUMN VII Max. STLC Allowed by Regulation Catch 22 Mg/L |
|---|---|---|---|---|---|---|
| Sb | 13.2 | <1.0 | <1.0 | <0.02 | 500 | 15 |
| As | 4.3 | 6.0 | 2.3 | 0.08 | 500 | 5.0 |
| Ba | 74.4 | 259.0 | 81.6 | 1.5 | 10,000 | 100 |
| Bc | 1.4 | 2.5 | 0.5 | <0.2 | 75 | 0.75 |
| Cd | 593 | 12.4 | 1.7 | 0.007 | 100 | 1.0 |
| Cr | 13,900 | 8,040 | 82.4 | <0.1 | 2,500 | 560 |
| Co | 57.6 | 12.4 | 2.0 | <0.2 | 8,000 | 80 |
| Cu | 4,220 | 660 | 72.7 | 0.75 | 2,500 | 25 |
| Pb | 528 | 47.1 | 42.0 | <0.02 | 1,000 | 50 |
| Hg | 0.30 | <0.25 | <0.25 | <0.005 | 20 | 0.2 |
| Mo | 94.2 | 5.0 | 1.4 | <0.2 | 3,500 | 350 |
| Ni | 3,940 | 206 | 37.2 | <0.10 | 2,000 | 20 |
| Ag | <1.0 | <1.0 | <1.0 | <0.004 | 500 | 5 |
| Sc | 21.1 | 25 | <2.5 | <0.5 | 100 | 1 |
| Th | <1.0 | <1.0 | <1.0 | <0.2 | 700 | 7 |
| V | 1,190 | 110 | 33.1 | 1.5 | 2,400 | 24 |

-continued

| COLUMN I Element | COLUMN II Dewatered Sludge Cake Mg/Kg | COLUMN III Ceramic Fired at 1700° TTLC Mg/Kg | COLUMN IV Ceramic Fired at 2200° TTLC Mg/Kg | COLUMN V Ceramic Fired at 2200° F. (STLC) Mg/Kg | COLUMN VI Max. TTLC Allowed by Regulation Catch 22 Mg/Kg | COLUMN VII Max. STLC Allowed by Regulation Catch 22 Mg/L |
|---|---|---|---|---|---|---|
| Zn | 432 | 372 | 41.6 | 0.22 | 5,000 | 250 |

It is noted from the table, comparing Columns III and IV, that completing the ceramic at a higher temperature ties-up far higher toxic metal content, even against TTLC Tests. The exception, as expected, is lead (Pb). A sodium borate addition would cause the lead to glaze into the ceramic. Additives will be used when the sludges require some basic adjustment to make a suitable ceramic.

Example V

A sludge developed from Minnesota subsoil clay with silt and sand removed and the solids from the Twin Cities Pigs Eye Plant was adjusted with dry clay to an extrudable composition that was 70% clay, 7% organic and 23% water. The sample was formed by hand to about 5/16" cylinders and cut ⅜" long. Tumbling in a slow batch mixer produced cylinders somewhat longer than the diameter, with well rounded ends. These cylinders dried and fired at 2070° F., property expanded to light-weight aggregate. There was no measurable toxic or acid off-gases and no measurable amounts of metals when extracted with a 1% acetic acid solution.

Example VI

Example V was repeated except 40% of the clay was replaced with dry ash (combination of bottom ash and fly ash) obtained from the Pigs Eye incinerators. This change of raw material gave the same suitable light-weight aggregate and the same suitable tests. Cutting the aggregate in two showed white specks, believed to be the ash encased in the ceramic. Incorporating an ash known to contain low amounts of the toxic metals did not reduce the usefulness of the aggregate.

Example VII

Example V was repeated except 28% of the clay was replaced with the alum-lime cake generated at the St. Paul, Minn., Rice Street Water Plant. The aggregate was much like Example VI, including small white specks showing within the cut section.

When Examples V, VI and VII are considered together, it is evident that wastes, other than sewage sludges and industrial sludges can be incorporated into the ceramic aggregate and cause these wastes to become a part of a valuable product. The amounts used in Examples VI and VII represented the total wastes from these operations.

Example VIII

The clean water derived from waste water was used to change the water in three aquariums once each week for 162 weeks. Each aquarium contained a number of fathead minnows, known to be disease free as developed by the Ecology, Fish and Game Division of the University of Minnesota. Each aquarium was equipped with a proper spawn support and water plants were obtained from the local pet shop. Snails were accidentally imported with the water plants. The fish generated two new generations; snails multiplied beyond an accurate count. The water plants flourished. Now it was reasoned that any change of water that might have toxic organic materials or toxic heavy metals would produce irregularities in fish gills and for sure interfere with reproduction. It was judged from this Example that the clay sludge process removed all toxic materials each time waste water was processed. A record of amounts of each type of possible toxin would be an impossible task. It is to be pointed out that certain toxins, some of the heavy metals and some halocarbons were expected to show a long-term cumulative effect. No cumulative effect was ever found. It is also to be pointed out that all nitrogen compounds were removed down to less than several parts per million, using biological filters based on rice hull char. Such filters are described in U.S. Pat. No. 4,676,907, incorporated herein by reference.

Example IX

To the water used for Example VIII was added sufficient sodium selenate to be 10 parts per million measured as metallic selenium. While it was readily shown that nitrates, sulfates and selenate survive the clay reactions described herein, it was further shown that the use of the rice hull char biological filter in conjunction with this work and as described in said U.S. Pat. 4,676,907, that anaerobic bacteria develop on the rice hull char in the absence of air, that use not only nitrates but sulfates and selenates and even carbonates as oxygen sources for growth by reproduction. The waters developed a high turbidity which were yellowish flowers of sulfur with selenates absent but pink to red flowers of sulfur when the deep red selenium metal was formed by the reduction of selenates. Conditions developed that gave the appearance that selenates may be preferentially reduced as oxygen sources over sulfate and along with nitrate.

Example X

The waters recovered from Example IX were directed to individual aquarium experiments using the procedures for Example VIII. After six weeks the fathead minnows were examined for gill disturbances; none was observed.

Example XI

The sludge clay mix represented by Column III for Example I was dried at 225° F. The bed of pellets was composed of pellets from 5/16" average diameter to ⅜" average diameter and while drying in the non-air circulating oven, were arranged to be only 1 pellet deep. After 30 minutes at 225° F. they lost no more weight. An oil-based waste, also from Company C, was then added to the pellets while tumbling in a cement mixer. The pellets absorbed readily up to 8% oil without excess oil showing in the tumbling bed. These oil treated pellets were then fired at 2070° F. The number of gas jets needed to maintain the temperature was cut by 40%, showing the heat source due to this waste oil. The pellets assimilated the other wastes in the oil without any apparent change in properties. This example was then varied in a series of laboratory experiments by adding chlorocarbons, solvents, chlorocarbon wood preservatives, and several biocides; all seemed to incorporate into the raw ceramic pellets and all seemed to burn cleanly. Attempts to aspirate the off-gases through lime water absorption did not correlate with the amount of hydrogen chloride expected from combustion.

What is claimed is:

1. A process for treatment of waste water comprising the steps of:
    (a) mixing with said waste water a finely-divided clay to form a blend, wherein said waste water includes organic matter and heavy metals;
    (b) adding a flocculant to said blend in a manner such that said clay bonds to said flocculant to form a sludge;
    (c) separating said sludge from said water;
    (d) reducing water content of said sludge to less than about 60% by weight;
    (e) shaping said sludge to form particles of desired size and shape;
    (f) firing said sludge particles at a temperature of about 2,000° F. for a time sufficient to convert said sludge particles to expanded ceramic particles.

2. The expanded ceramic particles produced in accordance with the process of claim 1.

3. A process in accordance with claim 1, wherein said sludge particles are fired in an oxygen-containing atmosphere at a temperature of about 2000° F.

4. A process for making an expanded ceramic particle comprising the steps of:
    (a) mixing finely-divided clay with water containing waste material to form a blend; wherein said waste material includes organic matter and heavy metals;
    (b) adding a flocculant to said blend in a manner such that said clay bonds to said flocculant to form a sludge;
    (c) separating said sludge from said water;
    (d) reducing water content of said sludge to less thin 60% by weight;
    (e) shaping said sludge to form particles;
    (f) firing said sludge particles at a temperature of about 2,000° F. for a time sufficient to convert said sludge particles to expanded ceramic particles.

5. A process in accordance with claim 4, wherein said clay is capable of absorbing said organic matter and adsorbing said heavy metals.

6. A process in accordance with claim 5, wherein said organic matter is selected from the group consisting of halocarbons, aromatic hydrocarbons, dioxanes, phenolics, cyano compounds, biocides, and mixtures thereof.

7. A process in accordance with claim 5, wherein said heavy metals are present in said sludge as oxides or hydroxides.

8. A process in accordance with claim 5, wherein said sludge further comprises phosphates, arsenates, sulfates, selenates, or fluoride ions.

9. A process in accordance with claim 4, further comprising the steps of:
    (a) wetting said ceramic particles with organic waste material in a liquid carrier; and
    (b) firing said ceramic particles in an oxygen-containing atmosphere, whereby said organic waste material is oxidized.

10. A process in accordance with claim 9, wherein said liquid carrier is selected from the group consisting of water, organic solvent, and oil.

11. A process in accordance with claim 9, wherein effluent gases are washed with an alkali solution.

12. The expanded ceramic particles produced in accordance with the process of claim 4.

* * * * *